Oct. 11, 1966   R. L. HOLCOMBE   3,277,587
TACTILE TRAINING SYSTEM
Filed Dec. 23, 1963
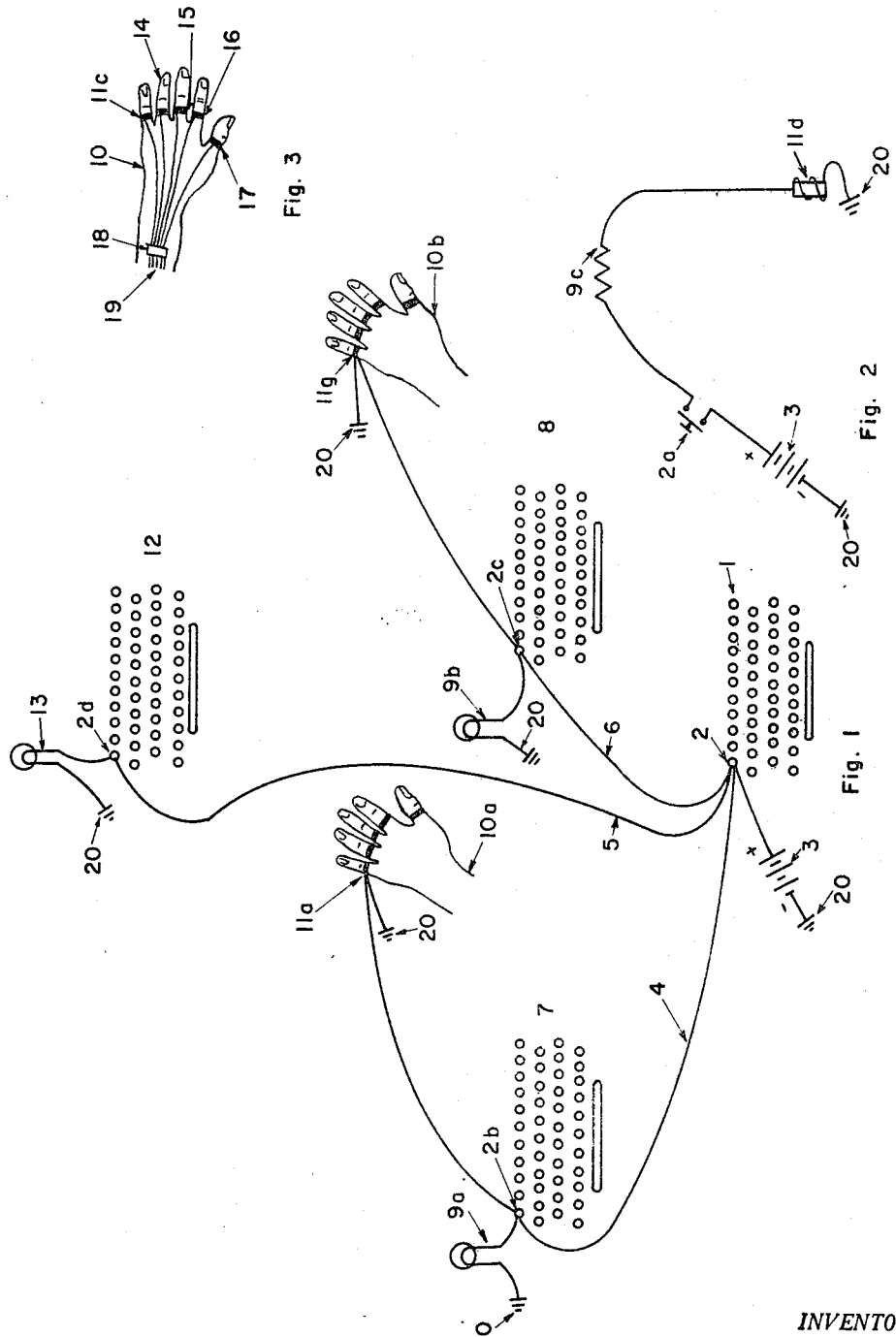
INVENTOR.
Ralph L. Holcombe

United States Patent Office 3,277,587
Patented Oct. 11, 1966

3,277,587
TACTILE TRAINING SYSTEM
Ralph L. Holcombe, Ada, Okla., assignor of ten percent to Robert B. Coleman, Jr., and Nanna L. Alderson, both of Ada, Okla.
Filed Dec. 23, 1963, Ser. No. 332,823
4 Claims. (Cl. 35—5)

This invention relates to a training system. In one of its aspects, this invention relates to a tactile, kinaesthesia, visual cuing system. In still another aspect, this invention relates to a system designed to train the appendages to perform a chore directly upon cue.

In learning the operation of many devices, such as calculating or business machines, typewriters, piano, organ and the like, it is necessary to learn which fingers operate which key and the like. This, in many instances involves prolonged practice and memory work.

An object of this invention is to provide a system of signaling the various appendages to perform a given chore upon signal supplied by central operation.

This and other objects of this invention is accomplished by sending a signal to an appendage and registering a visual signal on device to be operated upon performance of similar or identical operation by the instructor.

This invention can best be described by referring to the drawing of which:

FIG. 1 is a schematic diagram of this invention as applied to teaching operation of a typewriter.

FIG. 2 is a schematic diagram of the circuit of this invention; and

FIG. 3 is a schematic illustration of the wiring of a hand as used in this invention.

My invention will now be described in conjunction with the teaching of touch typing. It will be obvious that the method here used is equally useful in teaching the use of calculating machines and other devices wherein a keyboard is activated by the finger. The invention is also useful in teaching one to play a musical instrument such as piano, accordion, harpsichord, organ and other such musical instruments employing a keyboard. To those skilled in the art, it will be obvious that the system herein disclosed would also be useful in training one to operate almost any device or machine employing the use of hands, arms, legs, feet and the like, such as flying an airplane, operating a tractor, crane or the like.

Referring now to the drawing, master keyboard 1 is operated by the instructor. When key 2 is depressed, it closes switch 2a completing the circuit from power source to student keyboards 7 and 8 and to central keyboard 12 via conduits 4, 6, and 5 respectively. Central keyboard 12 is a visual representation of the student keyboards and is optional equipment. Keys 2b, 2c, and 2d are equipped with a small light 9a and 9b respectively. This light can be separately wired as shown in FIG. 1 or can be wired in series with solenoid 11d as shown in FIG. 2. In either case the solenoid is an elastic loop on little fingers 11a and 11b of hands 10a and 10b is activated simultaneous with the lights 9a, 9b and 13. In each case the circuits are coupled through ground 20. The student being prompted by the sensation felt in the finger and the visual signal on his keyboard will depress the proper key. Each finger will be equipped with loops, elastic in nature, on both hands. The loops should be loose enough not to impede action of the fingers.

Each key will be wired so as to signal the proper key and finger and each hand 20 will have conduits 19 to a 5 prong plug 18. This plug is attached to loops 11c, 14, 15, 16 and 17.

This invention has been described in conjunction with a preferred embodiment. Those skilled in the art, will see many applications and modifications. For example, a vibrator could be used in place of the solenoid. In some applications an audio signal in lieu of the visual signal. As has been previously mentioned, central keyboard 12 is optional. However, this keyboard is useful after the students remove the solenoids containing loops. The invention has been illustrated with two student keyboards, however, it is obvious that 1 or more students can be trained simultaneous with this system.

I claim:

1. A training method comprising the steps of: performing a predetermined sequence of operations on a master apparatus; imparting a similar sequence of mechanical sensations on one or more operation-performing appendages of an operator who is to perform identical operations in the same sequence; simultaneously imparting a sequence of perception signals to a second apparatus, which signals correspond to the operation in said sequence of the master apparatus, upon which said predetermined sequence of operations was performed.

2. The method of claim 1 wherein the imparting of mechanical sensations on one or more operation-performing appendages is by means of a solenoid responsive to performing said predetermined operation and said perception signal is a light means.

3. The method of claim 2 wherein said master and second apparatus are business machines.

4. The method of claim 3 wherein said business machine is a typewriter.

References Cited by the Examiner
FOREIGN PATENTS
668,757 8/1963 Canada.
896,806 5/1962 Great Britain.

EUGENE R. CAPOZIO, Primary Examiner.
R. E. KLEIN, Assistant Examiner.